United States Patent
Dobrowolski

(10) Patent No.: US 9,582,915 B2
(45) Date of Patent: Feb. 28, 2017

(54) METHOD, APPARATUS AND COMPUTER PROGRAM PRODUCT FOR IMPROVED VISUALIZATION OF GEO-LOCATED FEATURES

(71) Applicant: HERE GLOBAL B.V., Veldhoven (NL)

(72) Inventor: Tomasz Dobrowolski, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 61 days.

(21) Appl. No.: 14/577,284

(22) Filed: Dec. 19, 2014

(65) Prior Publication Data

US 2016/0180561 A1  Jun. 23, 2016

(51) Int. Cl.
*G06T 11/60* (2006.01)
*G06T 3/00* (2006.01)

(52) U.S. Cl.
CPC ............... *G06T 11/60* (2013.01); *G06T 3/00* (2013.01)

(58) Field of Classification Search
None
See application file for complete search history.

(56) References Cited

U.S. PATENT DOCUMENTS

| | | | |
|---|---|---|---|
| 8,098,894 B2 | 1/2012 | Soderstrom | |
| 8,423,536 B2 | 4/2013 | Lieske, Jr. et al. | |
| 8,825,392 B2 | 9/2014 | Stroila | |
| 2005/0251331 A1* | 11/2005 | Kreft | G01C 3/08 701/438 |
| 2009/0110302 A1* | 4/2009 | Snow | G06T 17/05 382/225 |
| 2009/0171570 A1* | 7/2009 | Chiba | G01C 21/3682 701/532 |
| 2011/0141115 A1 | 6/2011 | Brandes et al. | |
| 2012/0268485 A1 | 10/2012 | Icho et al. | |
| 2013/0030699 A1 | 1/2013 | Barnes et al. | |
| 2013/0061165 A1 | 3/2013 | Adkins | |
| 2013/0073988 A1* | 3/2013 | Groten | G06Q 30/02 715/753 |

(Continued)

FOREIGN PATENT DOCUMENTS

DE   WO 2012152982 A1 * 11/2012 ........... G01C 21/367

OTHER PUBLICATIONS gvSIG Mini for Andriod showing POI and address searching and routing on Vimeo [online] [retrieved Jan. 23, 2015]. Retrieved from the Internet: <URL: http://vimeo.com/6376800> (dated Sep. 1, 2009) 3 pages.

*Primary Examiner* — Kee M Tung
*Assistant Examiner* — Nicholas R Wilson
(74) *Attorney, Agent, or Firm* — Alston & Bird LLP

(57) ABSTRACT

A method, apparatus and computer program product are provided for improved visualization of geo-located features. Geo-located features may be displayed with respect to a perspective point, such that the size of an indicator of a geo-located feature is representative of a distance of the feature from the perspective point. The positioning of the geo-located feature is indicative of the direction of the geo-located feature relative to the perspective point. Thus, compact visualization of the geo-located features may be provided. Animated transitions may be provided such that indicators gradually move as the perspective point moves, so that a user may maintain perspective.

20 Claims, 8 Drawing Sheets

(56) References Cited

U.S. PATENT DOCUMENTS

2013/0249812 A1* 9/2013 Ramos .................. G06F 3/0481
345/173
2014/0071170 A1 3/2014 Kroeber

* cited by examiner

METHOD, APPARATUS AND COMPUTER PROGRAM PRODUCT FOR IMPROVED VISUALIZATION OF GEO-LOCATED FEATURES

TECHNOLOGICAL FIELD

An example embodiment of the present invention relates generally to providing visualization of geo-located features, and more particularly, to a method, apparatus and computer program product for providing compact visualization of geo-located features relative to a perspective point.

BACKGROUND

The use of mobile technology has increased drastically to the point of ubiquity. With the increasing dependence on mobile devices comes a demand for mobile applications that are compatible with mobile devices and present information in a format that may be perceivable by the user, even on a small mobile device display screen. However, the abundance of information available via the Internet and various software applications can result in an overwhelming amount of data to be displayed on a mobile device. In some instances, displaying too much information on a mobile device display may hinder usability.

Mapping applications in particular have access to a large amount of data relating to navigation, routing, points of interest, and/or the like. Displaying all the available information to a user for a given portion of a map may be so overwhelming that the mapping application becomes impractical to use. Furthermore, users relying on a mobile application for navigation purposes may need to focus on driving and cannot look at the device display for more than a few seconds at any given time. The use of mobile technology for navigation purposes therefore creates an even greater challenge of how to effectively display information on a device.

BRIEF SUMMARY

A method, apparatus, and computer program product are therefore provided for providing improved visualization of geo-located features.

A method is provided, including, for each of a plurality of geo-located features, determining a distance from each respective geo-located feature to a perspective point. The method further includes, with a processor, generating an indicator for each of the plurality of geo-located features. The size of each indicator indicates a distance from the respective geo-located feature to the perspective point relative to each other. The method further includes causing display of a perspective point indicator and each of the indicators in respective positions relative to the perspective point indicator such that the respective positions indicate general locations of the features with respect to the perspective point.

In some examples, the indicators are spaced relative to the perspective point indicator without regard to distance of the respective geo-located features to the perspective point.

In some examples, the method includes determining a first radius of an indicator for a closest geo-located feature. The radius is determined based on the distance of the respective geo-located feature to the perspective point. The method includes determining the radius of other indicators such that each radius is proportional to the respective distance between the respective geo-located feature and the perspective point.

In some examples, the method includes, for each geo-located feature, beginning with the closest geo-located feature and proceeding with each geo-located feature in an order from closest to furthest relative to the perspective point, determining a nearest point on a ray extending from the perspective point in a direction of the geo-located feature such that positioning a center of the respective indicator at the nearest point avoids overlapping of the respective indicator with any other indicator including the perspective point indicator.

In some embodiments, the method includes, for each geo-located feature, beginning with the closest geo-located feature and proceeding with each geo-located feature in an order from closest to furthest relative to the perspective point, determining a nearest point in a positional range extending from the perspective point in a direction so as to include the geo-located feature such that positioning a center of the respective indicator at the nearest point avoids overlapping of the respective indicator and any other indicator including the perspective point indicator. The positional range is defined based on a ray extending from the perspective point in a direction of the geo-located feature and bound by edges defined by at least one of a threshold distance from the ray or a threshold angle from the ray.

In some examples, the method further includes determining a visual padding between two indicators that is proportional to the distance between the two respective geo-located features, and causing application of the visual padding to the displayed indicators.

In some examples, the method further includes, in response to determining that at least two geo-located features are within a threshold distance of each other, merging the respective indicators into one indicator.

In some examples, the method includes determining that a position of the perspective point is changed, and in response to determining that the position of the perspective point is changed, linearly interpolating the position and size of respective indicators based upon an extent of change in the position of the perspective point.

An apparatus is also provided. The apparatus comprises at least one processor and at least one memory including computer program code, the at least one memory and the computer program code configured to, with the processor, cause the apparatus to at least, for each of a plurality of geo-located features, determine a distance from each respective geo-located feature to a perspective point. The apparatus is further caused to generate an indicator for each of the plurality of geo-located features. The size of each indicator indicates a distance from the respective geo-located feature to the perspective point relative to each other. The apparatus is further caused to display a perspective point indicator and each of the indicators in respective positions relative to the perspective point indicator such that the respective positions indicate general locations of the features with respect to the perspective point.

In some examples, the indicators are spaced relative to the perspective point indicator without regard to distance of the respective geo-located features to the perspective point.

In some embodiments, the apparatus is further caused to determine a first radius of an indicator for a closest geo-located feature. The radius is determined based on the distance of the respective geo-located feature to the perspective point. The apparatus is further caused to determine the radius of other indicators such that each radius is proportional to the respective distance between the respective geo-located feature and the perspective point.

In some embodiments, the apparatus is further caused to, for each geo-located feature, beginning with the closest geo-located feature and proceeding with each geo-located feature in an order from closest to furthest relative to the perspective point, determine a nearest point on a ray extending from the perspective point in a direction of the geo-located feature such that positioning a center of the respective indicator at the nearest point avoids overlapping of the respective indicator with any other indicator including the perspective point indicator.

The apparatus may be further caused to, for each geo-located feature, beginning with the closest geo-located feature and proceeding with each geo-located feature in an order from closest to furthest relative to the perspective point, determine a nearest point in a positional range extending from the perspective point in a direction so as to include the geo-located feature such that positioning a center of the respective indicator at the nearest point avoids overlapping of the respective indicator and any other indicator including the perspective point indicator. The positional range is defined based on a ray extending from the perspective point in a direction of the geo-located feature and bound by edges defined by at least one of a threshold distance from the ray or a threshold angle from the ray.

In some embodiments, the apparatus is further caused to determine a visual padding between two indicators that is proportional to the distance between the two respective geo-located features, and cause application of the visual padding to the displayed indicators.

In some examples, the apparatus is further caused to, in response to determining that at least two geo-located features are within a threshold distance of each other, merge the respective indicators into one indicator.

In some embodiments, the apparatus is further caused to determine that a position of the perspective point is changed, and in response to determining that the position of the perspective point is changed, linearly interpolate the position and size of respective indicators based upon an extent of change in the position of the perspective point.

A computer program product is also provided. The computer program product comprises at least one non-transitory computer-readable storage medium having computer-executable program code instructions stored therein, the computer-executable program code instructions comprising program code instructions to, for each of a plurality of geo-located features, determine a distance from each respective geo-located feature to a perspective point.

The computer program product includes program code instructions to generate an indicator for each of the plurality of geo-located features. The size of each indicator indicates a distance from the respective geo-located feature to the perspective point relative to each other. The computer program product further includes program code instructions to cause display of a perspective point indicator and each of the indicators in respective positions relative to the perspective point indicator such that the respective positions indicate general locations of the features with respect to the perspective point.

In some examples, the indicators are spaced relative to the perspective point indicator without regard to distance of the respective geo-located features to the perspective point.

The computer program product includes program code instructions to determine a first radius of an indicator for a closest geo-located feature, wherein the radius is determined based on the distance of the respective geo-located feature to the perspective point, and determine the radius of other indicators such that each radius is proportional to the respective distance between the respective geo-located feature and the perspective point.

The computer program product includes program code instructions to, for each geo-located feature, beginning with the closest geo-located feature and proceeding with each geo-located feature in an order from closest to furthest relative to the perspective point, determine a nearest point on a ray extending from the perspective point in a direction of the geo-located feature such that positioning a center of the respective indicator at the nearest point avoids overlapping of the respective indicator with any other indicator including the perspective point indicator.

An apparatus is also provided with means for, for each of a plurality of geo-located features, determining a distance from each respective geo-located feature to a perspective point. The apparatus further includes means for generating an indicator for each of the plurality of geo-located features. The size of each indicator indicates a distance from the respective geo-located feature to the perspective point relative to each other. The apparatus further includes means to cause display of a perspective point indicator and each of the indicators in respective positions relative to the perspective point indicator such that the respective positions indicate general locations of the features with respect to the perspective point.

BRIEF DESCRIPTION OF THE DRAWINGS

Figure 1:
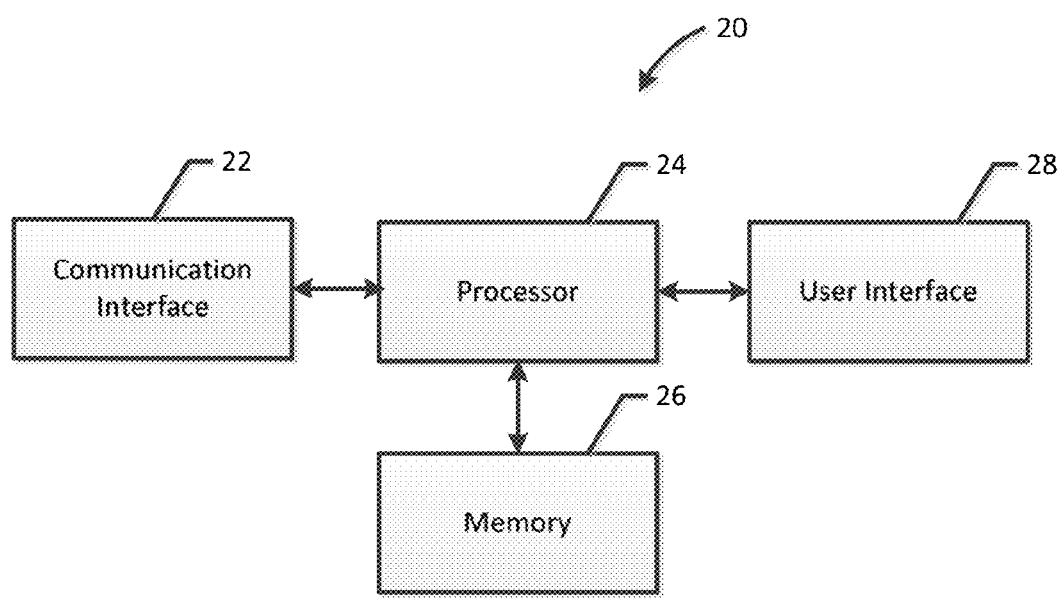
Figure 2:
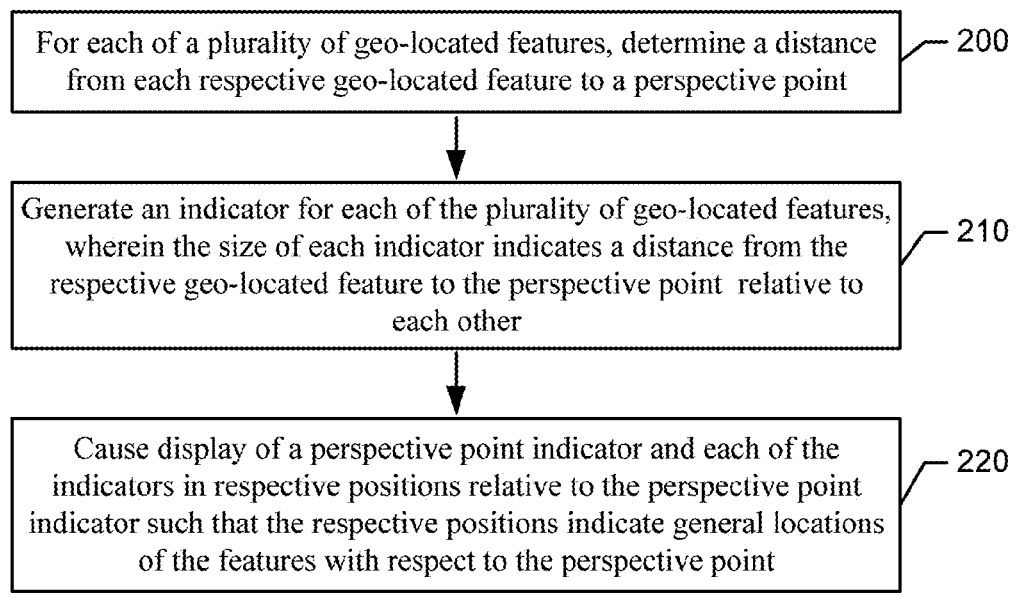
Figure 3:
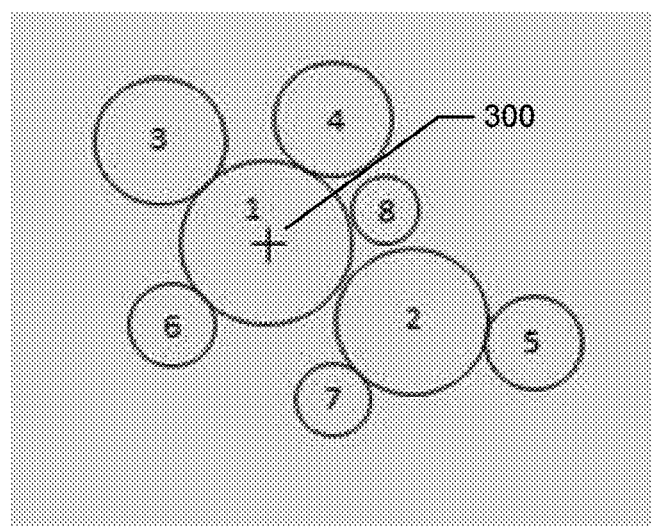
Figure 4:
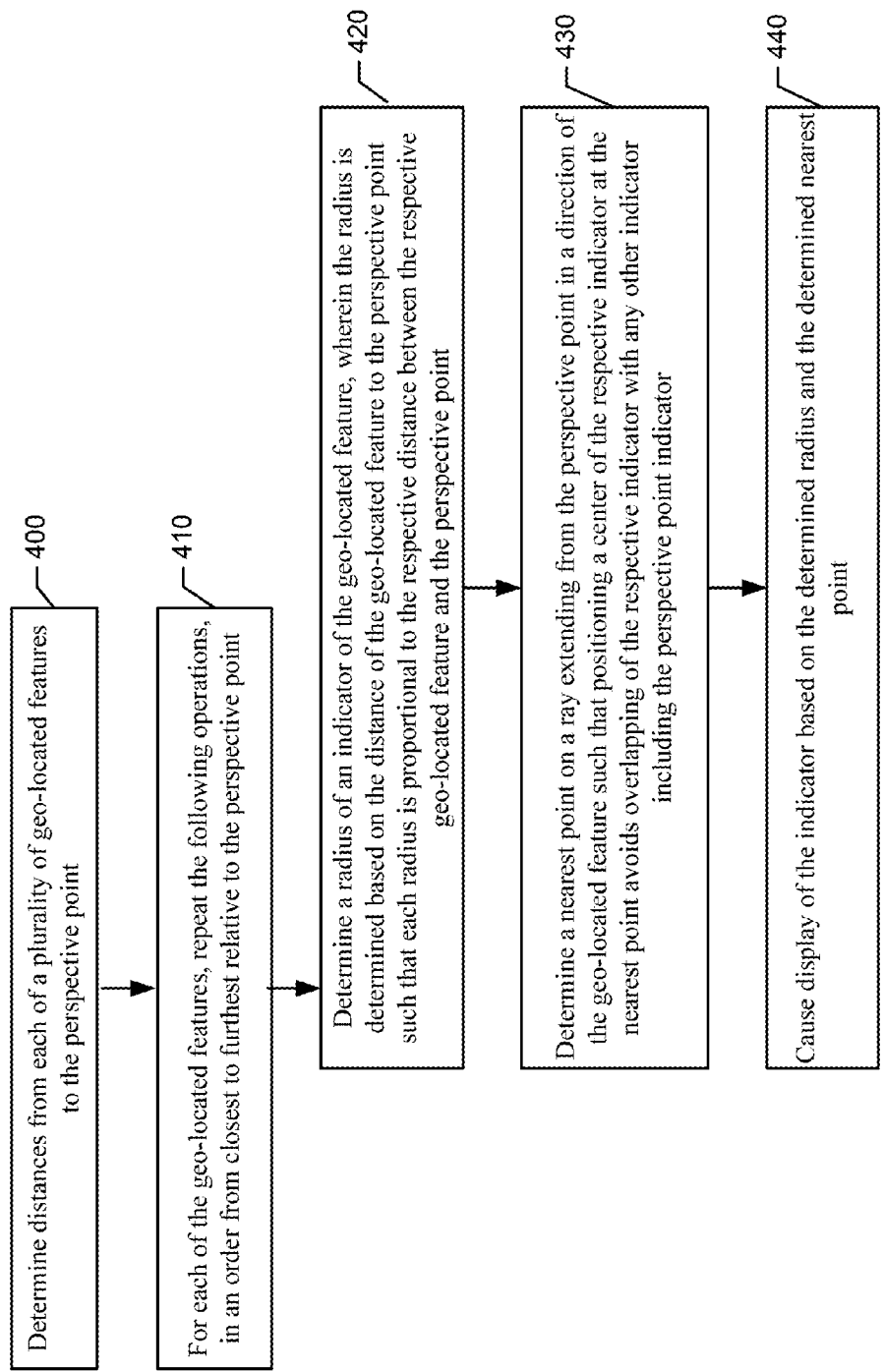
Figure 6:
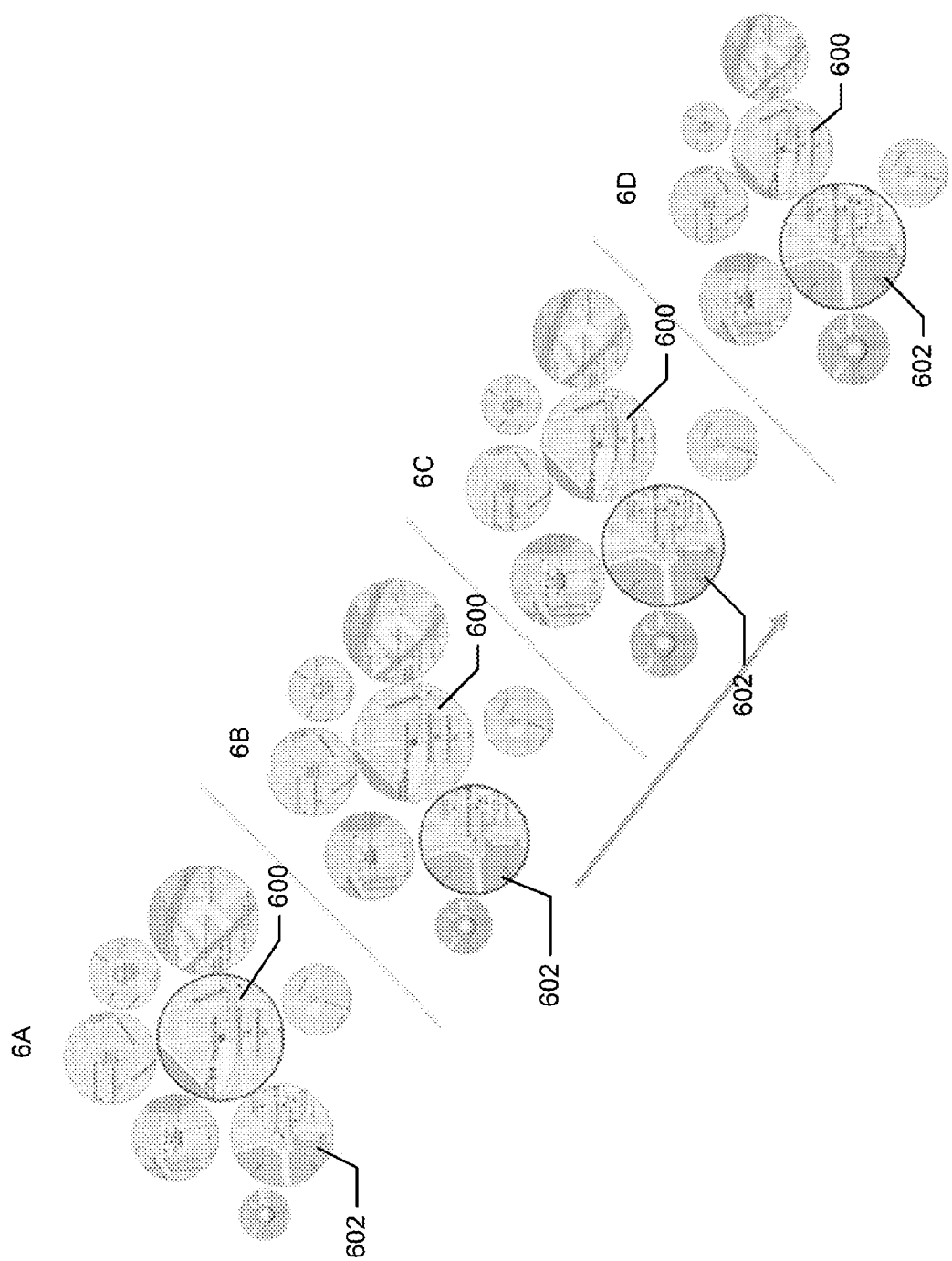
Figure 7:
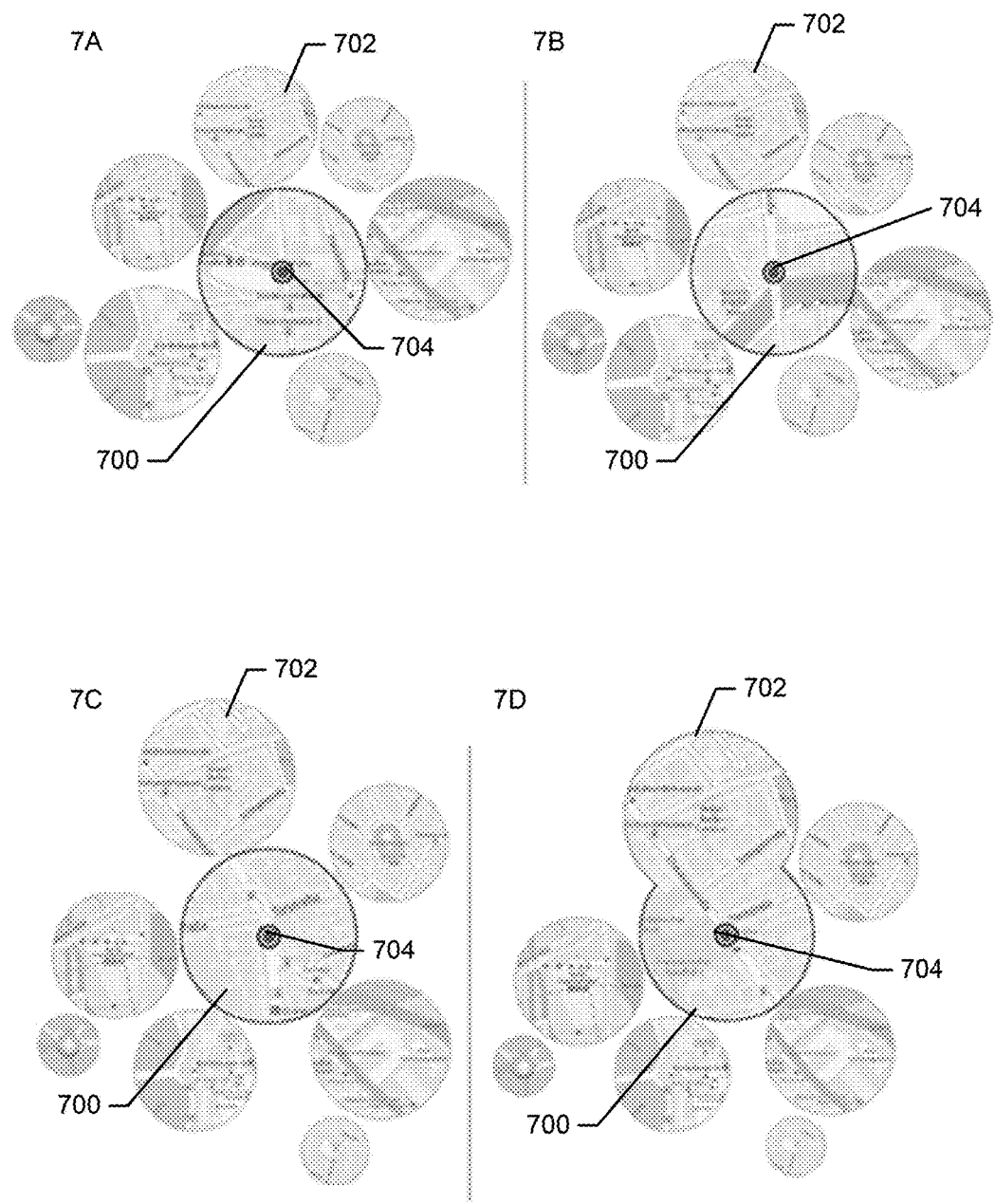
Figure 8B:
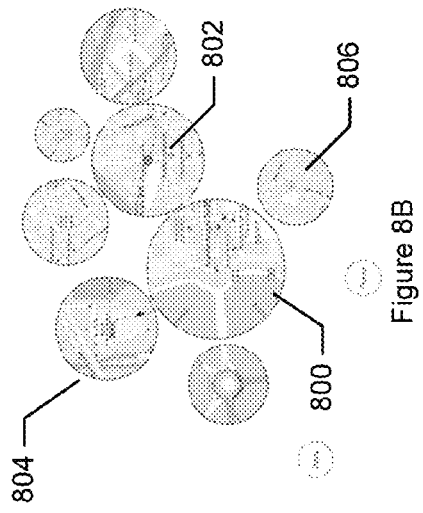
Figure 8A:
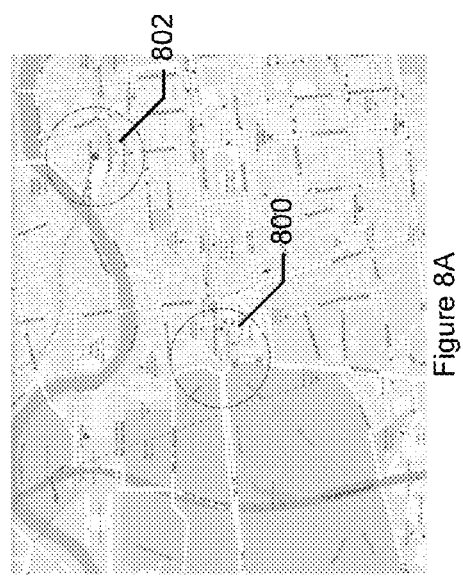
Figure 8C:
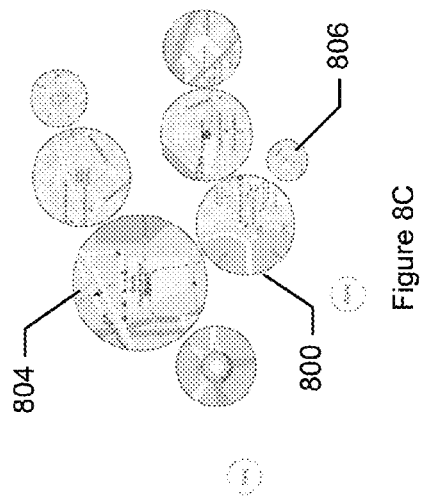

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a flowchart of operations for providing improved visualization of geo-located features, according to an example embodiment;

FIG. 3 is an example display, according to an example embodiment;

FIG. 4 is a flowchart of operations for providing improved visualization of geo-located features, according to an example embodiment;

FIGS. 5A-5J are example displays, according to an example embodiment;

FIGS. 6 and 7 are example displays illustrating transitions according to an example embodiment; and FIGS. 8A-8C are example displays, according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing improved visualization of geo-located features. In this regard, a user interface of a device, such a mobile device, personal computer, and/or the like, may provide a mapping application to a user. The user may search for geo-located features by category or by search term, for example, that are in close proximity to a perspective point. The perspective point may be a detected real-time location, address provided by the user, a city-center, other landmark, and/or the like. In some examples, the perspective point may be considered a geographic center. In some examples, the perspective point may change or move, such as when a user is navigating or moving. As another example, the perspective point may change by user selection of different locations. In another or additional examples, one or more of the geo-located features may move dynamically and/or automatically on a map based on changes to location information. Such a geo-located feature can be any object having embedded location determination technology, e.g. a car/vehicle, a mobile communication device, a navigation device and/or the like.

As an example, the user may search for restaurants in close proximity to a perspective point, such as a current location. Embodiments described herein provide a method, apparatus and computer program product for improved visualization of geo-located features. In particular, example embodiments provide a compact visualization of locations of the geo-located features relative to a perspective point, which may be particularly beneficial for use on a small display screen such as that of a mobile device.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing improved visualization of geo-located features. For example, the computing device may be a personal computer, laptop, personal digital assistant (PDA), mobile telephone, smart phone, personal navigation device, smart watch, tablet computer, camera or any combination of the aforementioned and other types of voice and text communications systems. Alternatively, the computing device may be a fixed computing device, such as a built-in vehicular navigation device or the like.

Still further, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors (not shown), such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may provide the improved visualizations of geo-located features, to a user via the user interface 28.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory 26. For example, the geographic database may include node data records, road segment or link data records, point of interest (POI) data records, cartographic data records, routing data, and/or maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

In some embodiments, the geo-located features may be identified based on POIs, such as gasoline stations, hotels, restaurants, museums, stadiums, offices, automobile dealerships, auto repair shops, buildings, stores, parks, etc. The geographic database can include data about the POIs and their respective locations in the POI data records.

The geographic database may be a server side geographic database accessible to apparatus 20 over communication interface 22, but in alternate embodiments, a client side geographic database, such as one stored on memory 26 can represent a compiled navigation database that can be used in or with a computing device to provide navigation and/or map-related functions. For example, the geographic database can be used with the end user device, such as apparatus 20, to provide an end user with navigation features or mapping functionality, such via user interface 28. For example, a user may enter search criteria via user interface 28 and the geographic database may provide POI data that may be utilized in the improved visualization of geo-located features as described herein. In some embodiments, the geographic database can be downloaded or stored on the computing device, such as in applications, or the computing device can access the geographic database through a wireless connection (such as via a server and/or a communication network), for example. Regardless of implementation, the geographic database may be utilized by the apparatus 20 to provide improved visualization of geo-located features as described herein according to example embodiments.

Having now described apparatus 20 according to an example embodiment, FIG. 2 is a flowchart of operations for providing improved visualization of geo-located features, according to example embodiments.

For each of a plurality of geo-located features, as shown by operation 200, the apparatus 20 may include means, such as processor 24, memory 26 and/or the like, to determine a distance from each respective geo-located feature to a perspective point. The perspective point may be a current location, or starting point for a navigational search, for example. The geo-located features may be any type of information having location relevance (such as latitude, longitude, address, name of geographical place, and/or the like). For example, the geo-located features may include search results to a location based search, such as for gas stations in close proximity to the perspective point. Other search parameters, POI data, and/or the like may result in a plurality of geo-located features being identified. In this regard, location information associated with each geo-located feature may be used to determine a distance between each geo-located feature and the perspective point.

As shown by operation 210, the apparatus 20 may include means, such as processor 24, memory 26 and/or the like, to generate an indicator for each of the plurality of geo-located features, wherein the size of each indicator indicates a distance from the respective geo-located feature to the perspective point relative to each other. The indicator of the geo-located features can depict a point of interest (POI), any graphical indication, dynamic content feature, current location indication, visualization of a map on a respective location, or any combination thereof.

As shown by operation 220, the apparatus 20 may include means, such as processor 24, memory 26, user interface 28 and/or the like, to cause display of a perspective point indicator and each of the indicators in respective positions relative to the perspective point indicator such that the respective positions indicate general locations of the features with respect to the perspective point. In this regard, a general location may not necessarily be indicated based on a same scale of a map, but may nevertheless provide useful information to a user regarding the location.

Operations 210 and 220 are reflected in FIG. 3, which is an example display that may be provided by apparatus 20 to provide improved visualization of geo-located features. Indicator 1 is a perspective point indicator representative of the perspective point such as a current location, or starting point for a navigational search, for example. The indicator 300 represents the center of the perspective point indicator 1.

Indicators 2-8 represent geo-located features. The geo-located features may be search results to a location based search, such as gas stations in close proximity to the perspective point.

The size of each indicator 2-8 indicates a distance from the respective geo-located feature (e.g., from its location) to the perspective point (e.g., to its location) relative to each other. For example, indicator 2 appears to be the largest of indicators 2-8, and therefore represents the closest geo-located feature to the perspective point. The indicator 2 is displayed in a position relative to the perspective point such that the respective positions indicate general locations of the features with respect to the perspective point. For example, the positioning of an indicator on a display may reflect an angle or compass direction of a geo-located feature relative to the perspective point. In examples in which the display of FIG. 2 is provided such that the top portion of the screen represents region north of portions on the bottom portion of the screen, the geo-located feature associated with indicator 2 is located southeast of the perspective point.

Indicator 3 may be considered the next largest indicator after indicator 2, so the associated geo-located feature may be the next closest to the perspective point, followed by indicator 4. Note that the indicators need not be positioned based on the distance from the geo-located feature to the perspective point, but rather the general direction of the geo-located feature relative to the perspective point. In this regard, a general direction provides positioning information of geo-located features relative to the perspective point and/or each other, but may not necessarily provide a precisely measured and scale direction. Similarly, the indicators may not be spaced from the perspective point indicator based on actual distance. The distance from geo-located features to the perspective point is instead indicated by the size of the indicators. In fact, in an example embodiment, one indicator representing a first geo-located feature could be positioned closer to the perspective point indicator than a second indicator representing a second geo-located feature, even though the second geo-located feature is actually closer to the perspective point.

As such, in some examples, the indicators are spaced relative to the perspective point indicator without regard to distance of the respective geo-located features to the perspective point. In some examples, the indicators 2-8 are also positioned based on relative directions from one another. For example, indicator 7 may represent a geo-located feature that is southwest of a geo-located feature indicated by indicator 2. Some indicators are positioned beside or adjacent to the perspective point indicator typically without overlapping each other, so that the closest geo-located feature has a priority in a sequence. However, in some occasions neighboring indicators can at least partially merge, for example if the overlapping area of the neighboring indicators is bigger than a threshold value.

The compact positioning of the indicators provides an improved visualization for users, particularly users of mobile devices having small display screens. Geo-located features otherwise positioned off the display screen due to a scaling or zoom level of a base map, may be displayed according to example embodiments. The display provides general directions and distances of geo-located features in an easily perceived layout conducive to navigating or mapping locations on a small display.

While the indicators of FIG. 3 are circles, and the determination of size of such indicators are described throughout as being based on a radius of a circles, it will be appreciated that other shapes of indicators may be provided. Similarly, the radius is one indication of a size of an indicator, but it will be appreciated that many other dimension calculations may be made.

Having now generally described an example display providing improved visualization of geo-located features according to an example embodiment, FIG. 4 is a flowchart of operations performed by apparatus 20 for providing improved visualization of geo-located features.

Figure 5A:
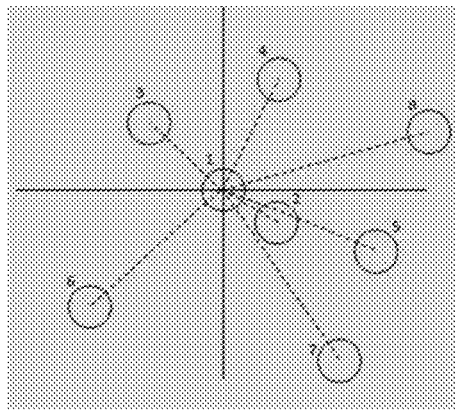

As shown by operation 400, the apparatus 20 may include means, such as processor 24, memory 26 and/or the like, to determine distances from each of a plurality of geo-located features to the perspective point. In this regard, location information associated with each geo-located feature may be used to determine a distance between each geo-located feature and the perspective point. A list may be stored, such as in memory 26 or the like, of the geo-located features in an order based on distance. For example, FIG. 5A illustrates indicators for respective geo-located features 2-8 in positions based on their actual locations taking into account a scale of the display (e.g., 5 miles per inch of display). The indicators are numbered in order based on the distance of their respective geo-located features from the perspective point 1, and each circle has a default radius, which may be a predetermined and/or fixed amount. It will be appreciated that the example displays provided herein include intermediary displays used to illustrate various operations for calculating sizing and/or positioning of indicators according to example embodiments. It will be appreciated that not all displays are necessarily generated for display by the user interface 28, but instead some may be provided for illustrative purposes.

As shown by operation 410, the apparatus 20 may include means, such as processor 24, memory 26 and/or the like, to repeat the following operations 420, 430, and 440 for each of the geo-located features, in an order from closest to furthest relative to the perspective point. The furthest geo-located feature from the perspective point is therefore processed last. It will be appreciated that in some examples, the iteration of operations for each geo-located feature may vary. For example, operation 420 may be performed for each of the geo-located features, followed by operation 420 being performed for the geo-located features. Furthermore, the processing of steps 420 and 430 may not follow any specific order.

As shown by operation 420, the apparatus 20 may include means, such as processor 24, memory 26 and/or the like, to determine a radius of an indicator of the geo-located feature. The radius may be determined based on the distance of the geo-located feature to the perspective point such that each radius is proportional to the respective distance between the respective geo-located feature and the perspective point. In some examples, the radius or size of the indicator of the geo-located feature can be fixed or the same for all the indicators, for example when the indicators are POI signs. Alternatively or additionally, the radius or size of the indicator of the geo-located feature can be determined based on the type or category of the geo-located feature, e.g. type of restaurant, user ratings, etc. Alternatively or additionally, the radius or size of the indicator of the geo-located feature can be determined based on the value or relevance of the geo-located feature to the user, (e.g. fuel price information in the case of fuel stations).

For example, based on any of the geo-located features and their respective distances, the apparatus 20, such as with processor 24, may calculate a ratio of distance between geo-located features and the perspective point to a radius of the indicator as displayed on the screen. For example, the ratio may be defined such that an indicator has a radius of 1 centimeter for every 5 miles of distance between the respective geo-located feature and perspective point. In some examples, the ratio may be calculated based on the furthest geo-located feature. In some examples, the ratio may be calculated based on a median or average distance of geo-located features to the perspective point.

Figure 5B:
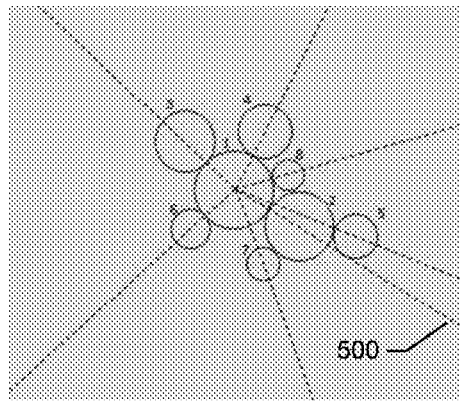

Regardless of implementation, the radius of each indicator is proportional to the distance of the respective geo-located feature to the perspective point, as depicted in FIG. 5B. The positioning of the indicators as depicted in FIG. 5B is described in further detail with respect to operations 430 and 440 below.

As shown by operation 430, the apparatus 20 may include means, such as processor 24, memory 26 and/or the like, to determine a nearest point on a ray extending from the perspective point. The ray extends in a direction of the geo-located feature such that positioning a center of the respective indicator at the nearest point avoids overlapping of the respective indicator with any other indicator including the perspective point indicator. At operation 440, the apparatus 20 may include means, such as communication interface 22, user interface 28, and/or processor 24, to cause display of the indicator based on the determined radius and the determined nearest point.

FIG. 5B illustrates the positioning of the indicators as described in operations 430 and 440. Since indicator 2 is associated with the closest geo-located feature to the perspective point, the indicator 2 may be placed on ray 500 that extends from perspective point indicator 1 to the location of geo-located feature represented by indicator 1. The indicator 2 is then moved inward along the ray 500 until it is close to, or adjacent to the perspective point indicator 1 (based on the radius of indicator 2 as determined in operation 420). In this example, the indicator 2 does not overlap the perspective point indictor 1.

Figure 5C:
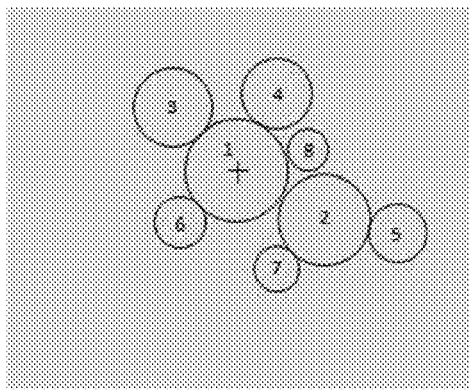

As illustrated in FIG. 5B, all the indicators having their respective calculated radiuses are positioned in an order beginning with the closest and ending with the further associated geo-located feature. As a result, indicator 5 is positioned further away from the perspective point indicator 1, because the relatively larger indicator 2 prevents indicator 5 from being positioned any closer. FIG. 5C is an example layout similar to that of FIG. 5B, but in which the rays are not depicted, which may be provided for display to a user. A user may therefore quickly and/or easily perceive information regarding the distance and relative direction of various geo-located features (based on respective indicators 2-8) with respect to the perspective point indicator 1.

While FIG. 4 illustrates example operations of apparatus 20, and FIGS. 5A-5C illustrate example sizing and positioning of indicators, in some embodiments, some variations of the size and positioning of the indicators may be made.

Figure 5D:
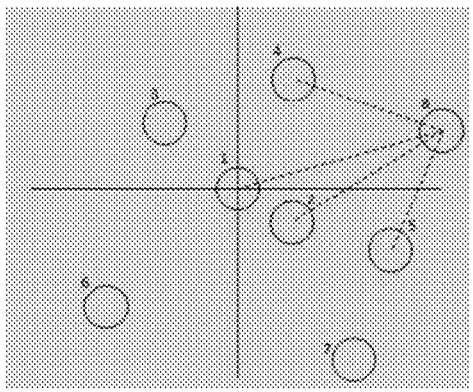

For example, padding may be applied to any of the indicators such as to improve visualization. The padding may be calculated and/or applied to any number of indicators as often as each time a new indicator is added. For example, the padding as described below may occur prior to operation 430 in the above described process. In this regard, the apparatus 20 may include means, such as processor 24, to determine a visual padding between two indicators that is proportional to the distance between the two respective geo-located features, and applying the visual padding to the displayed indicators. For example, padding may be added to indicators of geo-located features for improved visibility, based on distances of geo-located features to each other, or to the perspective point. In FIG. 5D, prior to positioning indicator 8, the distances of indicator 8 to respective other indicators are considered. The apparatus 20, such as with processor 24, may determine an amount of padding by which to expand an indicator based on the distance of the respective geo-located feature to another geo-located feature.

Figure 5E:
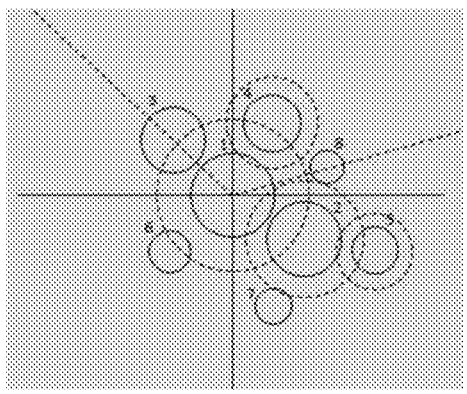
Figure 5F:
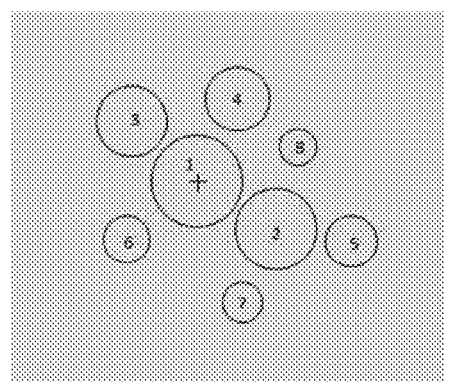

In some examples, padding may be applied to all indicators based on a positioning of another indicator. In some examples, padding may only be applied to an indicator positioned on the same half of a display, or a same quadrant, within an angular threshold, and/or the like. For example, the perspective point indicator 1, and indicators 2, 4, and 5 are shown in FIG. 5E with a dashed line around the indicators, indicating the padding. The amount of padding is proportional to the distance of indicator 8 to each respective indicator, or the center of indicator 8 to each respective center. Following the padding calculations, indicator 8 may be positioned along the corresponding array, closest to indicator 1 without creating overlap with the padding. FIG. 5F illustrates the positioning of indicator 8 after adding padding to other indicators. The layout of FIG. 5F may be presented to a user to provide improved visualization.

As another example, the apparatus 20, such as with processor 24, may provide tolerance in positioning of an indicator based on a tolerance factor defined by angles and/or distance. In this regard, for each geo-located feature, beginning with the closest geo-located feature and proceeding with each geo-located feature in an order closest to furthest from the perspective point, the apparatus 20 determines a nearest point in a positional range extending from the perspective point in a direction so as to include the geo-located feature such that positioning a center of the respective indicator on the nearest point avoids overlapping of the respective indicator and the perspective point indicator and does not result in an overlapping of the respective indicator and any other indicator including the perspective point indicator. The positional range is defined based on a ray extending from the perspective point in a direction of the geo-located feature and bound by edges defined by at least one of a threshold distance from the ray or a threshold angle from the ray.

Figure 5G:
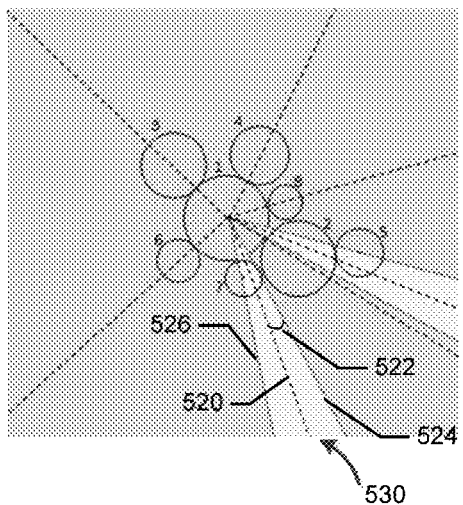
Figure 5H:
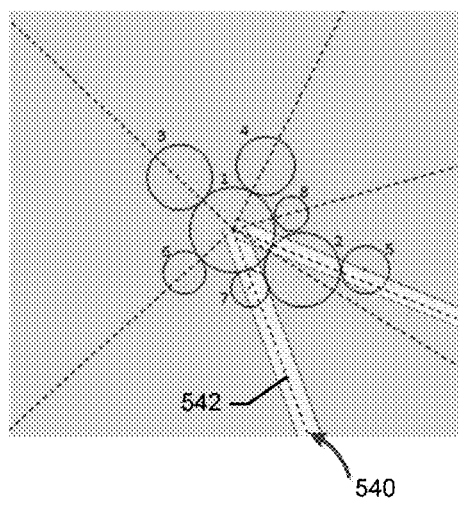

As illustrated in FIG. 5G, a ray 520 is illustrated by a dashed line extending from the perspective point 1 through a geo-located feature associated with indicator 7. In some examples, the positioning of an indicator may vary slightly based on a positional range centered on the ray as defined by an angle 522 from the perspective point to the edges 524 and 526 of the positional range. For example, the angle may be pre-defined as 30 degrees, or any other value. As such, operation 430 may be modified such that instead of positioning an indicator on the nearest point on the ray 520 such that overlap does not occur, the indicator may be positioned anywhere in the positional range 530. In the example FIG. 5G, indicator 7 is positioned closer to the perspective point 1 than if the indicator 7 were positioned on the ray 520.

As yet another example, the positional range 540 is defined by edges that are parallel to and a predefined distance from the ray 542. The distance may be defined by a geographic distance, such as a based on the scale of a displayed map. For example, the predefined distance may be 1 mile. Operation 430 may then be modified such that the position of the indicator falls within the positional range, similar to the angular modification described above.

The angular and distance tolerance variations described above with respect to FIGS. 5G and 5H provide for a more compact visualization of the geo-located features.

Figure 5I:
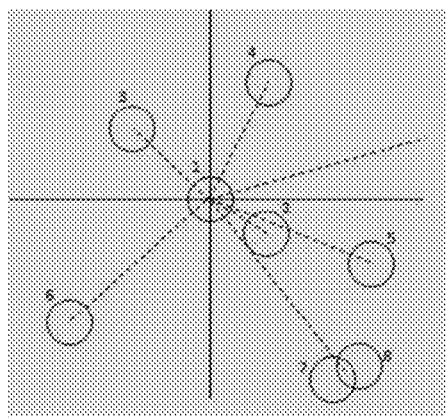
Figure 5J:
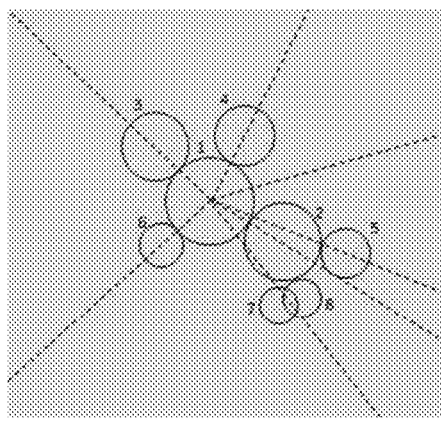

FIGS. 5I and 5J illustrate additional optional variations according to example embodiments. In some examples, two or more indicators of geo-located features may be merged with each other and/or the perspective point to improve visualization. For example, two or more geo-located features may be in close proximity to each other such that positioning them based on the above provided algorithm which prevents overlap, may result in a confusing visualization, where the indicators are not ideally positioned so as to allow the user to perceive the general position or direction to the geo-located feature from the perspective point.

In an example embodiment, the apparatus 20 may comprise means, such as processor 24, for determining that two indicators will be merged. For example, when analyzing actual locations of geo-located features with respect to the scale of the display, the processor 24 may determine that a distance between two indicators in their initial positions is smaller than the sum of the default radiuses representing them. In some examples, the apparatus 20 may analyze the calculated radiuses such as determined in operation 420, of two or more indicators, and determine the indicators should be merged.

The merged indicators 7 and 8 may therefore be treated as a single shape, when positioned according to operation 430. As illustrated in FIG. 5J, the merged indicators 7 and 8 are positioned together adjacent to indicator 2. Without the merging variation, indicator 7 may have otherwise been positioned closer to the perspective point. The merging feature therefore provides an improved visualization of the geo-located features. In particular, the merging of two indicators enables a user to perceive the proximity of the two associated geo-located features to each other.

FIGS. 6 and 7 illustrate additional features that may be provided by apparatus 20. The indicators may be displayed with a base layer map such that a user may view a street map, or other map for the immediate area surrounding the respective geo-located features. The area displayed in each indicator may be provided based on the same scale. In some examples, the map portions displayed within an indicator may be zoomed in or out for improved visualization. In some examples, the background may be blank, or the background of the indicators may display a base layer map. In some examples, a base layer map of the background may be different than that of the indicators.

FIGS. 6 and 7 also illustrate transitions throughout layouts 6A-6D and 7A-7D respectively, as the perspective point changes. According to the process provided herein, two slightly different layouts may be generated for the same set of geo-located features having a slightly different perspective point. The apparatus 20 may provide smooth transitions between such layouts to provide improved visualization of geo-located features.

As reflected in FIG. 6, a user browsing through search results or a collection of bookmarks such as favorite locations, can select a different perspective point. For example, indictor 600 may initially be the perspective point indicator, but the user selects to change indicator 602 to become the perspective point. The apparatus 20 may, in such scenarios, generate a smooth transition animation between the respective layouts, such that the user can easily maintain perspective between the changing perspective point and respective geo-located features. In this example, layouts 6B and 6C are generated and a smooth transition is animated such that the indicators gradually move into position between layouts. The indicators surrounding indicators 600 and 602 may gradually shift accordingly, but the general position of indicators 600 and 602 relative to each other remains generally the same so as to allow the user to maintain perspective. The displayed map portion within each indicator also updates accordingly.

FIG. 7 reflects another scenario in which the user is moving (e.g., driving). For example, a position of a user detected by GPS may be considered the perspective point. For every incremental change in a current location (e.g., as determined by a predetermined threshold distance), a new layout may be calculated, and a smooth animated transition between layouts may be provided. As another example, a user may track a moving position of another object, such as a friend. In FIG. 7, the layouts 7A-7D are transitioned such that the perspective point indicator 700 remains in a generally central location on the display screen, and the indicators of geo-located features move relative to the changing position of the perspective point and may change their radius respectively For example indicator 702 becomes larger throughout the transition from layout 7A-7D. In layout 7D, indicator 702 partially merges with the perspective point indicator 700. The current location 704 of the moving object remains central in the perspective point indicator 700, and updates with respect to the displayed map portion within the indicator.

To calculate a transition, the apparatus 20 may utilize linear interpolation for a position and a radius of geo-located features based on actual geographic locations. As such, the apparatus 20 may include means, such as processor 24, to in response to determining that the position of the perspective point is changed, linearly interpolate the position and size of respective indicators based upon an extent of change in the position of the perspective point. The linear interpolation is generally not applied based on display screen locations of indicators so as to minimize overlapping during transition. However, as illustrated in layout 7D, merging may still occur for improved visualization. For example, the apparatus 20 may ensure that indicators are merged only if the indicators should be merged in an initial and ending layout. The indicators should not be merged during a transition alone.

In some examples, the transition between each layout may be generated such that the linear interpolation is applied to the geo-located features based on a same location of the perspective point. Said differently, the perspective point indicator may not necessarily change location in every transition so as to allow the user to maintain perspective, such as illustrated in FIG. 6.

Many variations may be applied to the features provided herein to enable a user-interactive interface conducive for improved visualization of geo-located features. For example, FIGS. 8A-8C illustrate additional variations of example embodiments.

FIG. 8A is an example display that may be provided by apparatus 20. Two geo-located features are indicated by indicators 800 and 802. A user selects indicator 800, and the display transitions to the display of FIG. 8B. Indicator 800 is now the perspective point indicator. The indicator 802 transitions closer to perspective point indicator 800, and other indicators transition into position on the display (that were previously off screen due to the scale of the map in FIG. 8A). Further, the user may toggle between the map view 8A and the perspective view 8B.

From the display of FIG. 8B, the user may select indicator 804. The perspective point changes to indicator 804, as depicted in FIG. 8C. Note that the sizes and positioning of some indicators change accordingly. For example, indicator 806 becomes noticeably smaller. The positions of the indicators respective to each other also change.

In some examples, a user may even select and drag an indicator, such as indicator 804, so as to simulate a changing location, or perspective point. The displayed map portion within the indicator 804 may pan accordingly. Additionally or alternatively, as the perspective point changes, the indicators may change size and positioning accordingly. Such a feature enables a user to browse the map while maintaining perspective of the perspective point and the surrounding geo-located features.

The example embodiments provided herein provide for improved visualization of geo-located features. In some examples, various features or modifications as described herein are applied so as to improve the visualization of geo-located features with respect to a geo-graphic center. Such embodiments may help a user maintain perspective while navigating, or browsing a map, for example. Example embodiments particularly improve visualization on a smaller display screen such as that of a mobile device. Geo-located features that may otherwise be located off-screen may be represented on the smaller display screen. The indicators may be sized and positioned such that the general distance and direction from the perspective point may be easily interpreted by the user. Example embodiments are also particularly advantageous for use while navigating, as a user may perceive pertinent information regarding locations with only a quick glance of the display screen.

Moreover, the method, apparatus and computer program product provide numerous technical advantages including the conservation of processing resources and the associated power consumption otherwise expended to support various user input to control a portion of a map and change views to center around various geo-located features. As an example a user may otherwise repeatedly provide pan and zoom inputs to gain an understanding of locations and directions of different geo-located features. Example embodiments provide for more efficient processing through the provision of improved visualization of geo-located features, as described herein.

As described above, FIGS. 2 and 4 illustrate flowcharts of operations of an apparatus 20, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodi- That which is claimed:

1. A method comprising:
   for each of a plurality of geo-located features, determining a distance from each respective geo-located feature to a perspective point;
   determining, with a processor, a radius-to-distance ratio, wherein the radius-to-distance ratio is a ratio between a radius of an indicator for each of the plurality of geo-located features and the distance from the respective geo-located feature to the perspective point relative to each other;
   with the processor, generating an indicator for each of the plurality of geo-located features, wherein the size of each indicator is determined based on the radius-to-distance ratio and indicates a distance from the respective geo-located feature to the perspective point relative to each other; and
   causing display of a perspective point indicator and each of the indicators in respective positions relative to the perspective point indicator such that the respective positions (a) indicate general directions of the corresponding features with respect to the perspective point and (b) are not configured to indicate relative distances of the corresponding features relative to each other.

2. The method of claim 1, wherein the indicators are spaced relative to the perspective point indicator without regard to distance of the respective geo-located features to the perspective point.

3. The method of claim 1, further comprising:
   determining a first radius of an indicator for a closest geo-located feature, wherein the radius is determined based on the distance of the respective geo-located feature to the perspective point;
   determining the radius-to-distance ratio based on the first radius and the distance of the respective geo-located feature to the perspective point; and
   determining the radius of other indicators in accordance with the radius-to-distance ratio such that each radius is proportional to the respective distance between the respective geo-located feature and the perspective point.

4. The method of claim 3, further comprising:
   for each geo-located feature, beginning with the closet geo-located feature and proceeding with each geo-located feature in an order from closest to furthest relative to the perspective point, determining a nearest point on a ray extending from the perspective point in a direction of the geo-located feature such that positioning a center of the respective indicator at the nearest point avoids overlapping of the respective indicator with any other indicator including the perspective point indicator.

5. The method of claim 4, further comprising:
   determining a visual padding between two indicators that is proportional to the distance between the two respective geo-located features; and
   causing application of the visual padding to the displayed indicators.

6. The method of claim 3, further comprising:
   for each geo-located feature, beginning with the closet geo-located feature and proceeding with each geo-located feature in an order from closest to furthest relative to the perspective point, determining a nearest point in a positional range extending from the perspective point in a direction so as to include the geo-located feature such that positioning a center of the respective indicator at the nearest point avoids overlapping of the respective indicator and any other indicator including the perspective point indicator, wherein the positional range is defined based on a ray extending from the perspective point in a direction of the geo-located feature and bound by edges defined by at least one of a threshold distance from the ray or a threshold angle from the ray.

7. The method of claim 1, further comprising:
   in response to determining that at least two geo-located features are within a threshold distance of each other, merging the respective indicators into one indicator.

8. The method of claim 1, further comprising:
   determining that a position of the perspective point is changed; and
   in response to determining that the position of the perspective point is changed, linearly interpolating the position and size of respective indicators based upon an extent of change in the position of the perspective point.

9. An apparatus comprising at least one processor and at least one memory including computer program code, the at least one memory and the computer program code configured to, with the processor, cause the apparatus to at least:
   for each of a plurality of geo-located features, determine a distance from each respective geo-located feature to a perspective point;
   determine a radius-to-distance ratio, wherein the radius-to-distance ratio is a ratio between a radius of an indicator for each of the plurality of geo-located features and the distance from the respective geo-located feature to the perspective point relative to each other;
   generate an indicator for each of the plurality of geo-located features, wherein the size of each indicator is determined based on the radius-to-distance ratio and indicates a distance from the respective geo-located feature to the perspective point relative to each other; and
   cause display of a perspective point indicator and each of the indicators in respective positions relative to the perspective point indicator that the respective positions (a) indicate general directions of the corresponding features with respect to the perspective point and (b) are not configured to indicate relative distances of the corresponding features relative to each other.

10. The apparatus of claim 9, wherein the indicators are spaced relative to the perspective point indicator without regard to distance of the respective geo-located features to the perspective point.

11. The apparatus of claim 9, wherein the at least one memory and the computer program code are further configured to, with the processor, cause the apparatus to at least:

determine a first radius of an indicator for a closest geo-located feature, wherein the radius is determined based on the distance of the respective geo-located feature to the perspective point;

determine the radius-to-distance ratio based on the first radius and the distance of the respective geo-located feature to the perspective point; and determine the radius of other indicators in accordance with the radius-to-distance ratio such that each radius is proportional to the respective distance between the respective geo-located feature and the perspective point.

12. The apparatus of claim 9, wherein the at least one memory and the computer program code are further configured to, with the processor, cause the apparatus to at least:

for each geo-located feature, beginning with the closet geo-located feature and proceeding with each geo-located feature in an order from closest to furthest relative to the perspective point, determine a nearest point on a ray extending from the perspective point in a direction of the geo-located feature such that positioning a center of the respective indicator at the nearest point avoids overlapping of the respective indicator with any other indicator including the perspective point indicator.

13. The apparatus of claim 9, wherein the at least one memory and the computer program code are further configured to, with the processor, cause the apparatus to at least:

for each geo-located feature, beginning with the closet geo-located feature and proceeding with each geo-located feature in an order from closest to furthest relative to the perspective point, determine a nearest point in a positional range positional range extending from the perspective point in a direction so as to include the geo-located feature such that positioning a center of the respective indicator at the nearest point avoids overlapping of the respective indicator and any other indicator including the perspective point indicator, wherein the positional range positional range is defined based on a ray extending from the perspective point in a direction of the geo-located feature and bound by edges defined by at least one of a threshold distance from the ray or a threshold angle from the ray.

14. The apparatus of claim 9, wherein the at least one memory and the computer program code are further configured to, with the processor, cause the apparatus to at least:

determine a visual padding between two indicators that is proportional to the distance between the two respective geo-located features; and cause application of the visual padding to the displayed indicators.

15. The apparatus of claim 9, wherein the at least one memory and the computer program code are further configured to, with the processor, cause the apparatus to at least:

in response to determining that at least two geo-located features are within a threshold distance of each other, merge the respective indicators into one indicator.

16. The apparatus of claim 9, wherein the at least one memory and the computer program code are further configured to, with the processor, cause the apparatus to at least:

determine that a position of the perspective point is changed; and in response to determining that the position of the perspective point is changed, linearly interpolate the position and size of respective indicators based upon an extent of change in the position of the perspective point.

17. A computer program product comprising at least one non-transitory computer-readable storage medium having computer-executable program code instructions stored therein, the computer-executable program code instructions comprising program code instructions to:

for each of a plurality of geo-located features, determine a distance from each respective geo-located feature to a perspective point;

determine a radius-to-distance ratio, wherein the radius-to-distance ratio is a ratio between a radius of an indicator for each of the plurality of geo-located features and the distance from the respective geo-located feature to the perspective point relative to each other;

generate an indicator for each of the plurality of geo-located features, wherein the size of each indicator is determined based on the radius-to-distance ratio and indicates a distance from the respective geo-located feature to the perspective point relative to each other; and cause display of a perspective point indicator and each of the indicators in respective positions relative to the perspective point indicator that the respective positions (a) indicate general directions of the corresponding features with respect to the perspective point and (b) are not configured to indicate relative distances of the corresponding features relative to each other.

18. The computer program product of claim 17, wherein the indicators are spaced relative to the perspective point indicator without regard to distance of the respective geo-located features to the perspective point.

19. The computer program product of claim 17, wherein the computer-executable program code instructions further comprise program code instructions to:

determine a first radius of an indicator for a closest geo-located feature, wherein the radius is determined based on the distance of the respective geo-located feature to the perspective point;

determine the radius-to-distance ratio based on the first radius and the distance of the respective geo-located feature to the perspective point; and determine the radius of other indicators in accordance with the radius-to-distance ratio such that each radius is proportional to the respective distance between the respective geo-located feature and the perspective point.

20. The computer program product of claim 17, wherein the computer-executable program code instructions further comprise program code instructions to:

for each geo-located feature, beginning with the closet geo-located feature and proceeding with each geo-located feature in an order from closest to furthest relative to the perspective point, determine a nearest point on a ray extending from the perspective point in a direction of the geo-located feature such that positioning a center of the respective indicator at the nearest point avoids overlapping of the respective indicator with any other indicator including the perspective point indicator.

* * * * *